United States Patent
Boyns et al.

(10) Patent No.: US 8,645,491 B2
(45) Date of Patent: Feb. 4, 2014

(54) METHODS AND APPARATUS FOR ENABLING A HYBRID WEB AND NATIVE APPLICATION

(75) Inventors: Mark Boyns, Alpine, CA (US); Michael P. Mahan, San Diego, CA (US); Mandyam Vikram, San Diego, CA (US); Ashutosh Aggarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 13/229,758

(22) Filed: Sep. 11, 2011

(65) Prior Publication Data
US 2012/0158893 A1    Jun. 21, 2012

Related U.S. Application Data

(60) Provisional application No. 61/424,622, filed on Dec. 18, 2010.

(51) Int. Cl.
G06F 15/16 (2006.01)

(52) U.S. Cl.
USPC .......................................... 709/217; 709/224

(58) Field of Classification Search
USPC .................... 709/200–203, 217–227, 228
See application file for complete search history.

(56) References Cited

U.S. PATENT DOCUMENTS

| | | | |
|---|---|---|---|
| 6,088,340 A * | 7/2000 | Buchholz et al. | 370/310 |
| 6,772,144 B2 * | 8/2004 | Brid et al. | 1/1 |
| 7,171,443 B2 * | 1/2007 | Tiemann et al. | 709/203 |
| 7,386,786 B2 | 6/2008 | Davis et al. | |
| 7,458,031 B2 * | 11/2008 | Aamodt et al. | 715/765 |
| 7,565,175 B2 * | 7/2009 | Pell et al. | 455/566 |
| 7,587,669 B2 | 9/2009 | Rana | |
| 7,603,632 B1 * | 10/2009 | Aamodt et al. | 715/853 |
| 7,610,406 B2 | 10/2009 | Wu | |
| 7,640,491 B2 * | 12/2009 | Goodacre et al. | 715/234 |
| 7,739,310 B1 * | 6/2010 | Shmulevich et al. | 707/802 |
| 7,831,926 B2 | 11/2010 | Rohrabaugh et al. | |
| 7,873,353 B2 * | 1/2011 | Kloba et al. | 455/412.2 |
| 7,904,807 B2 * | 3/2011 | Bell et al. | 715/249 |
| 7,984,119 B2 * | 7/2011 | Pham et al. | 709/220 |
| 8,103,865 B2 * | 1/2012 | Carion et al. | 713/100 |
| 2002/0143821 A1 | 10/2002 | Jakubowski | |
| 2005/0070259 A1 * | 3/2005 | Kloba et al. | 455/414.2 |
| 2005/0114528 A1 * | 5/2005 | Suito | 709/228 |

(Continued)

FOREIGN PATENT DOCUMENTS

WO    2010094927 A1    8/2010

OTHER PUBLICATIONS

International Search Report and Written Opinion—PCT/US2011/063013—ISA/EPO—Feb. 20, 2012.

*Primary Examiner* — Moustafa M Meky
(74) *Attorney, Agent, or Firm* — Fariba Yadegar-Bandari (57) ABSTRACT

Systems and methodologies are described that enable hybrid web and native applications. A communications device may be equipped to process one or more links where each link may be associated with a workflow directive. Further, the communications device may be equipped to process a workflow directive associated with a link to pre-render a template while a content request including the link is being transmitted. Still further, the communications device may be equipped to apply content received in response to the content request to the pre-rendered template.

27 Claims, 7 Drawing Sheets

(56) References Cited

U.S. PATENT DOCUMENTS

| | | | |
|---|---|---|---|
| 2005/0234864 A1* | 10/2005 | Shapiro | 707/1 |
| 2006/0041685 A1 | 2/2006 | Bracewell et al. | |
| 2007/0234224 A1* | 10/2007 | Leavitt et al. | 715/762 |
| 2008/0195691 A1* | 8/2008 | Kloba et al. | 709/201 |
| 2008/0244373 A1* | 10/2008 | Morris et al. | 715/202 |
| 2008/0288515 A1 | 11/2008 | Kim et al. | |
| 2011/0202933 A1* | 8/2011 | Sherrill | 719/328 |
| 2011/0283185 A1* | 11/2011 | Obasanjo et al. | 715/243 |

\* cited by examiner

METHODS AND APPARATUS FOR ENABLING A HYBRID WEB AND NATIVE APPLICATION

CLAIM OF PRIORITY UNDER 35 U.S.C. §119

The present application for patent claims priority to Provisional Application No. 61/424,622 entitled "METHODS AND APPARATUS FOR ENABLING A HYBRID WEB AND NATIVE APPLICATION" filed Dec. 18, 2010, and assigned to the assignee hereof and hereby expressly incorporated by reference herein.

BACKGROUND

The disclosed aspects relate generally to communications between devices and specifically to methods and systems for enabling hybrid web and native applications.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

Further, applications resident on a device may fall into categories, such as light (e.g., dumb), heavy (e.g., smart), etc. A light application, such as a web browser, may have limited ability to manipulate and manage data on the device, as light applications basically follow instructions provided to them with received content. As such, light applications allow a great degree of control from the network-side (e.g., web-side) while providing limited local flexibility. Further, when a device receives web-based content (e.g., such as a browser receiving a web page), the received content may include presentation information (e.g., formatting information, layout information, etc.) and data, where the presentation information defines how the data should be rendered. For example, the presentation information may include cascading style sheets (CSS) and other HTML data that a browser may parse into a document object model (DOM) for rendering the page. As such, the device has little local control over presentation options of web-based content.

On the other hand, heavy applications include substantial programming that allows them to provide for local control and management over received content. As such, heavy applications allow a great deal of local (e.g., native) control while having limited network-side control. For example, to change functionality of a heavy application updates may be used from the network-side.

Thus, improved apparatus and methods for enabling a hybrid web and native application may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to related aspects, a method for enabling hybrid web and native applications is provided. The method can include obtaining a selection of one link from a first set of one or more links. In such aspect, each link of the first set of one or more links is associated with a workflow directive. The method can also include transmitting a content request including the obtained selection of the one link from the one or more links. The method can also include processing the workflow directive associated with the one link from the first set of one or more links to pre-render a template contemporaneously with the content request transmission. The method can also include receiving a content message including content in response to the content request. Moreover, the method may include applying at least a portion of the received content from the content message to the pre-rendered template.

Another aspect relates to at least one processor configured to provide hybrid web and native functionality. The at least one processor may be configured to obtain a selection of one link from a first set of one or more links. In such aspect, each link of the first set of one or more links is associated with a workflow directive. The at least one processor may also be configured to transmit a content request including the obtained selection of the one link from the one or more links. The at least one processor may also be configured to process the workflow directive associated with the one link from the first set of one or more links to pre-render a template contemporaneously with the content request transmission. The at least one processor may also be configured to receive a content message including content in response to the content request. Moreover, the at least one processor may be configured to apply at least a portion of the received content from the content message to the pre-rendered template.

Yet another aspect relates to a wireless communications apparatus that provides hybrid web and native functionality. The wireless communications apparatus can include means for obtaining a selection of one link from a first set of one or more links. In such aspect, each link of the first set of one or more links is associated with a workflow directive. The wireless communications apparatus can additionally include means for transmitting a content request including the obtained selection of the one link from the one or more links. The wireless communications apparatus can additionally include means for processing the workflow directive associated with the one link from the first set of one or more links to pre-render a template contemporaneously with the content request transmission. The wireless communications apparatus can additionally include means for receiving a content message including content in response to the content request. Moreover, the wireless communications apparatus can include means for applying at least a portion of the received content from the content message to the pre-rendered template.

Another aspect relates to a wireless communications apparatus. The wireless communications apparatus can include a hybrid web and native module operable to obtain a selection of one link from a first set of one or more links. In such aspect, each link of the first set of one or more links is associated with a workflow directive. The wireless communications apparatus can include a transmitter operable to transmit a content request including the obtained selection of the one link from the one or more links. Further, the wireless communications apparatus hybrid web and native module may be operable to process the workflow directive associated with the one link from the first set of one or more links to pre-render a template contemporaneously with the content request transmission.

The wireless communications apparatus can include a receiver operable to receive a content message including content in response to the content request. Moreover, the wireless communications apparatus hybrid web and native module may be operable to apply at least a portion of the received content from the content message to the pre-rendered template.

Still another aspect relates to a computer program product, which can include a computer-readable medium. The computer-readable medium can include at least one instruction for causing a computer to obtain a selection of one link from a first set of one or more links. In such aspect, each link of the first set of one or more links is associated with a workflow directive. The computer-readable medium can also include at least one instruction for causing the computer to transmit a content request including the obtained selection of the one link from the one or more links. The computer-readable medium can also include at least one instruction for causing the computer to process the workflow directive associated with the one link from the first set of one or more links to pre-render a template contemporaneously with the content request transmission. The computer-readable medium can also include at least one instruction for causing the computer to receive a content message including content in response to the content request. Moreover, the computer-readable medium can include at least one instruction for causing the computer to apply at least a portion of the received content from the content message to the pre-rendered template.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a detailed understanding of one or more aspects. It may be evident, however, that such aspect(s) may be practiced without these specific details.

In accordance with one or more aspects and corresponding disclosure thereof, various aspects are described in connection with enabling hybrid web and native applications. In one example, a communications device may be equipped to process one or more links where each link may be associated with a workflow directive. Further, the communications device may be equipped to process a workflow directive associated with a link to pre-render a template while a content request including the link is being transmitted. Still further, the communications device may be equipped to apply content received in response to the content request to the pre-rendered template.

Generally, a communications device having a hybrid web and native module may provide efficient exchange of information with a content server through a network. This exchange of information may allow for content server (e.g., network-side) updates that provide a dynamically changeable user experience on the communications device. Additionally, the hybrid web and native module may provide integrated stateful functionality to allow for local operation on and/or control of content received from the network side. As used herein, stateful functionality may reference to settings/configurations associated with content and/or settings/configurations associated an application acting upon the content. As such, integrated stateful functionality may reference to sharing and/or knowledge of the stateful settings and/or configurations across multiple modules/platforms within the communications device. As used in this disclosure, the term "content" or "content item" includes, at least, one or more of any type of application, multimedia file, image file, executable, program, web page, script, document, presentation, message, a website, music, a movie, data, meta-data, or any other type of media or information that may be rendered, processed, or executed on a device, or an electronic identification of any of the foregoing. Still further, each content item may be associated with a workflow directive. In one aspect, a workflow directive may include fields indicating, links, data, objects, etc., and additional processing information associated with each of the fields. In one aspect, local operations and/or controls may be implemented through use of templates that may be pre-rendered in anticipation of expected content. As used herein, templates may include, but are not limited to, formatting and presentation information with stateful functionality to process received content and workflow directives. Thus, hybrid web and native module provides aspects of both a light application and a heavy application through interfacing of the web client portion with the stateful client portion. In one aspect, a communications device may be a wireless communications device (WCD), and/or multiple devices, both wireline and wireless. For example, multiple devices may work in tandem, as a network, etc.

Figure 1:
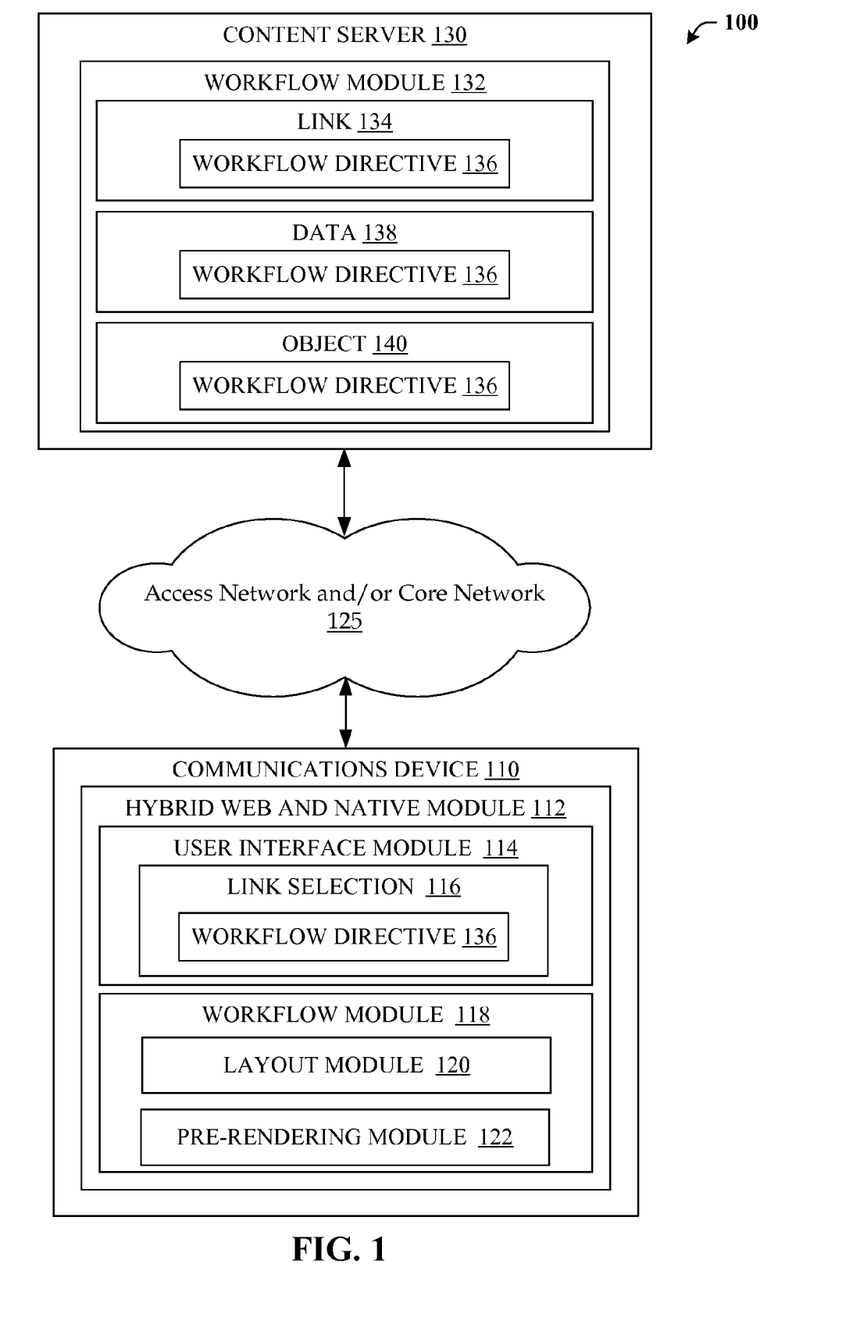
FIG. 1 illustrates a block diagram of a communication network according to an aspect.

With reference to FIG. 1, a block diagram of a communication network 100 according to an aspect is illustrated. Communication network 100 may include communications devices 110 connected to an access network and/or core network 125 (e.g., a CDMA network, a GPRS network, a UMTS network, and other types of wireline and wireless communication networks). Communication network 100 may further include one or more of servers, such as content server 130, connected to network 125.

In one aspect, communications device 110 may further include hybrid web and native module 112, which may be operable to provide integrated stateful functionality to allow for local operation on and/or control of data. In one aspect, hybrid web and native module 112 may work in conjunction with a web browser on the communications device 110. In another aspect, hybrid web and native module 112 may be operable in place of a web browser on the communications device 110. For example, hybrid web and native module 112 may use a Hypertext Transfer Protocol (HTTP) request to obtain information, such as but not limited to a Representational State Transfer (REST)-based mechanism, from content server 130 but without using JavaScript, a hypertext markup language (HTML) Document Object Model (DOM) tree, etc., such as used by a web browser. Further, hybrid web and native module 112 may be operable to store (e.g., cache) recently requested and/or commonly requested content on communications device 110 for efficient subsequent access.

Additionally, hybrid web and native module 112 may include user interface module 114 that may allow a user to select one or more link selections 116. In one aspect, each link has an associated workflow directive 136 which may provide hybrid web and native module 112 additional processing information related to the link selection 116. In one aspect, workflow directive 136 may include fields indicating, links, data, objects, etc., and additional processing information associated with each of the fields.

Further, hybrid web and native module 112 may include workflow module 118 that may be operable to allow local operations on obtained data. In one aspect, workflow module may include pre-rendering module 122 which may be operable to process an obtained workflow directive 136 and pre-render a template available through layout module 120. Additionally, workflow module 118 may be configured to perform operations such as, but not limited to, content downloads (e.g., network interactions) and installations, local content licensing checks, network checks for content updates and possible subsequent downloads and installs, content purchases (e.g., calling in to content server 130 (e.g., a network-based purchase system), making a payment, obtaining a license, etc.).

In one aspect, workflow module 118 may include dynamic layout coding within layout module 120. Such dynamic layout coding may have presentation coding that is operable on data obtained from content server 130, and may control the presentation of said data. In one aspect, layout module 120 may include an updateable scripting code, such as LUA code, that may be updated (via a network update) to thereby allow efficient changes to the user experience associated with a native application.

Further, in one aspect, layout module 120 may further include a priority identifier corresponding to each piece of data of received content. For example, the content may include one or more objects, such as banners, etc., such as may be associated with a promotional set of content. Each object may have a corresponding priority identifier. As such, for example, layout module 120 may generate a view of a "landing page" user interface, and may lay out the objects on the page according to the respective priority identifier. For instance, the one or more of objects may be presented in an ordered list, and the priority identifiers may comprise a plurality of different values that define a relative placement of the respective objects in the ordered list. In another aspect, layout module 120 may include a device-specific UI template that may define layout of data. In such aspect, data from received content may be presented in different manners on different communications devices 110. Furthermore, in one aspect, each piece of data corresponding to received content may have an original data layout characteristic (e.g., defined in a workflow directive 136), such as an aspect ratio. In such an aspect, workflow module 118 may be operable to use the workflow directive 136 information to generate additional versions of the data with different layout characteristics, such as different versions with different aspect ratios. For example, in an aspect, workflow module 118 can include a device database having a plurality of identified devices each with a device profile. Each device profile may include a display parameter that defines one or more device-specific layout parameters. Accordingly, workflow module 118 may generate one or more additional versions of the data having different layout characteristics to match each of the device-specific layout parameters in the device database.

In one aspect, content server 130 may include workflow module 132. As noted above, user interface module 114 may receive a user input selecting a link 116. Thereafter the link selection 116 may be transmitted to content server 130 to obtain the requested content. Workflow module 132 may be operable to process requests by providing one or more additional links 134, data 138, and/or one or more objects 140. As noted above, each link 134, data set 138, and object 140 may be associated with a workflow directive 136. The workflow directive may be operable to provide a communications device 110 with additional information related to the associated item (link 134, data 138, object 140, etc.). For example, a workflow directive 136 associated with a link 134 may indicate a structure associated with content accessible through the link (e.g., list, parent directory, sub-directory, etc.). In another example, a work directive 136 associated with data 138 may indicate data set size, formatting, headers, etc. In still another example, as noted above, a workflow directive 136 associated with an object may indicate object priority, listing structure, presentation formatting, etc.

As such, communication network 100 provides an environment in which communications device 110 may enable a hybrid web and native module 112 that provides aspects of both a light application and a heavy application through interfacing of the web client portion with the stateful client portion. In other words, the light application functionality of a web client may be provided through user interface module 116 and the heavy application stateful client functionality may be provided through workflow module 118.

Figure 2:
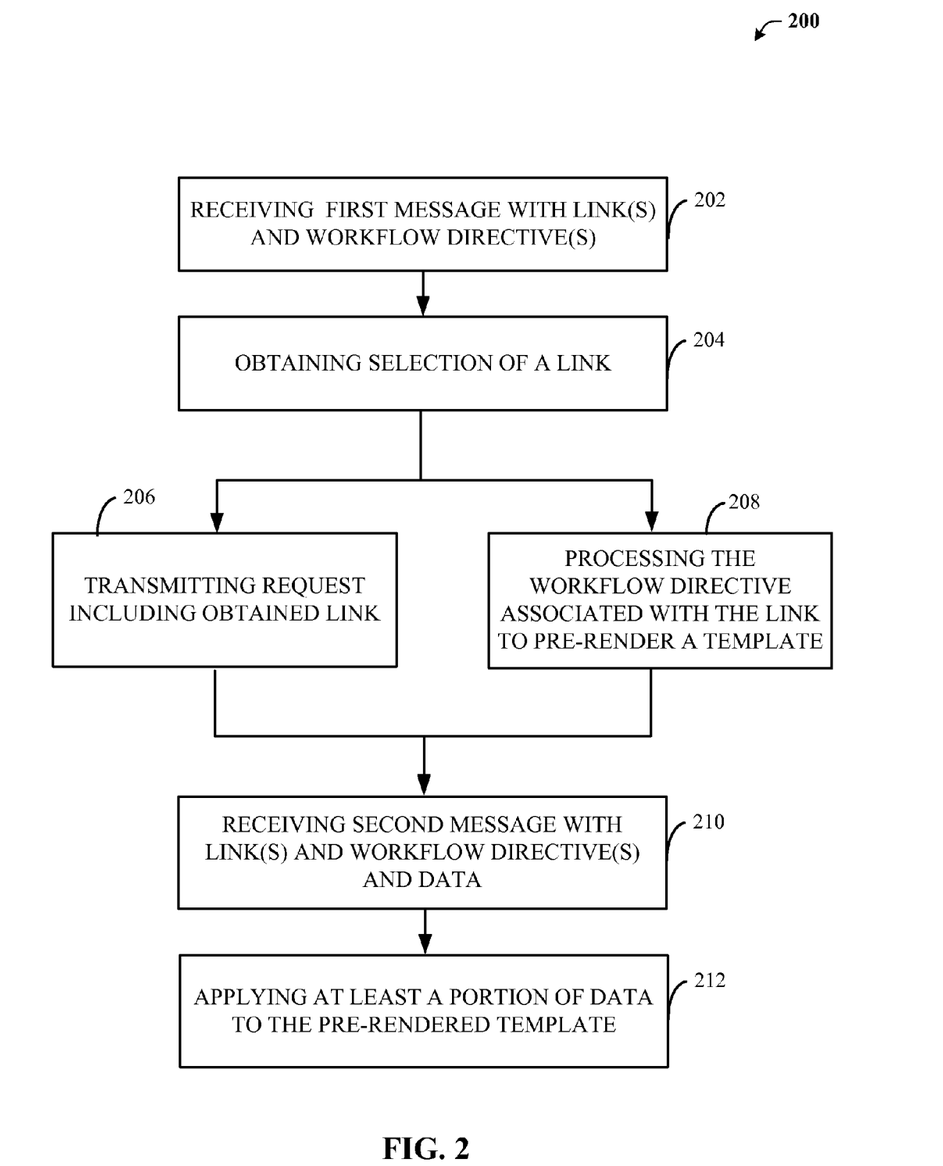
FIG. 2 illustrates a flowchart describing an example system for enabling a hybrid web and native application according to an aspect.
Figure 3:
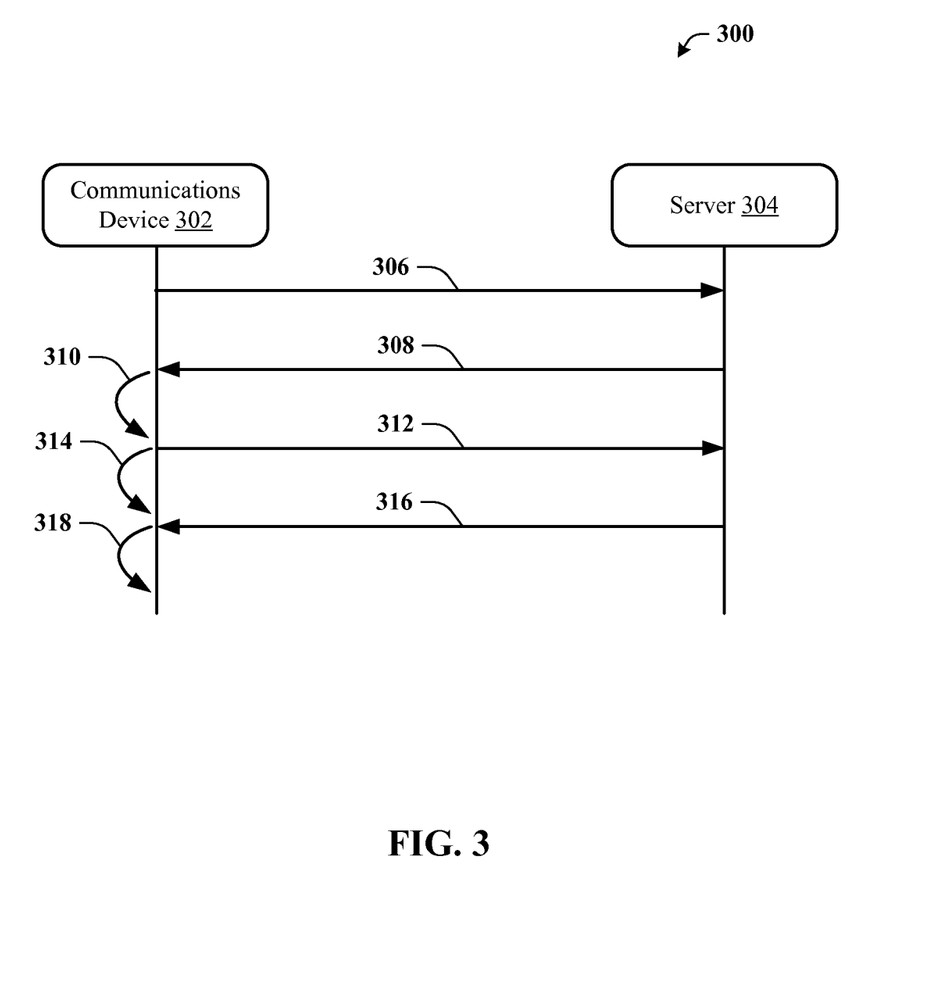
FIG. 3 illustrates a call flow diagram describing an example system for enabling hybrid web and native application according to an aspect.
Figure 4:
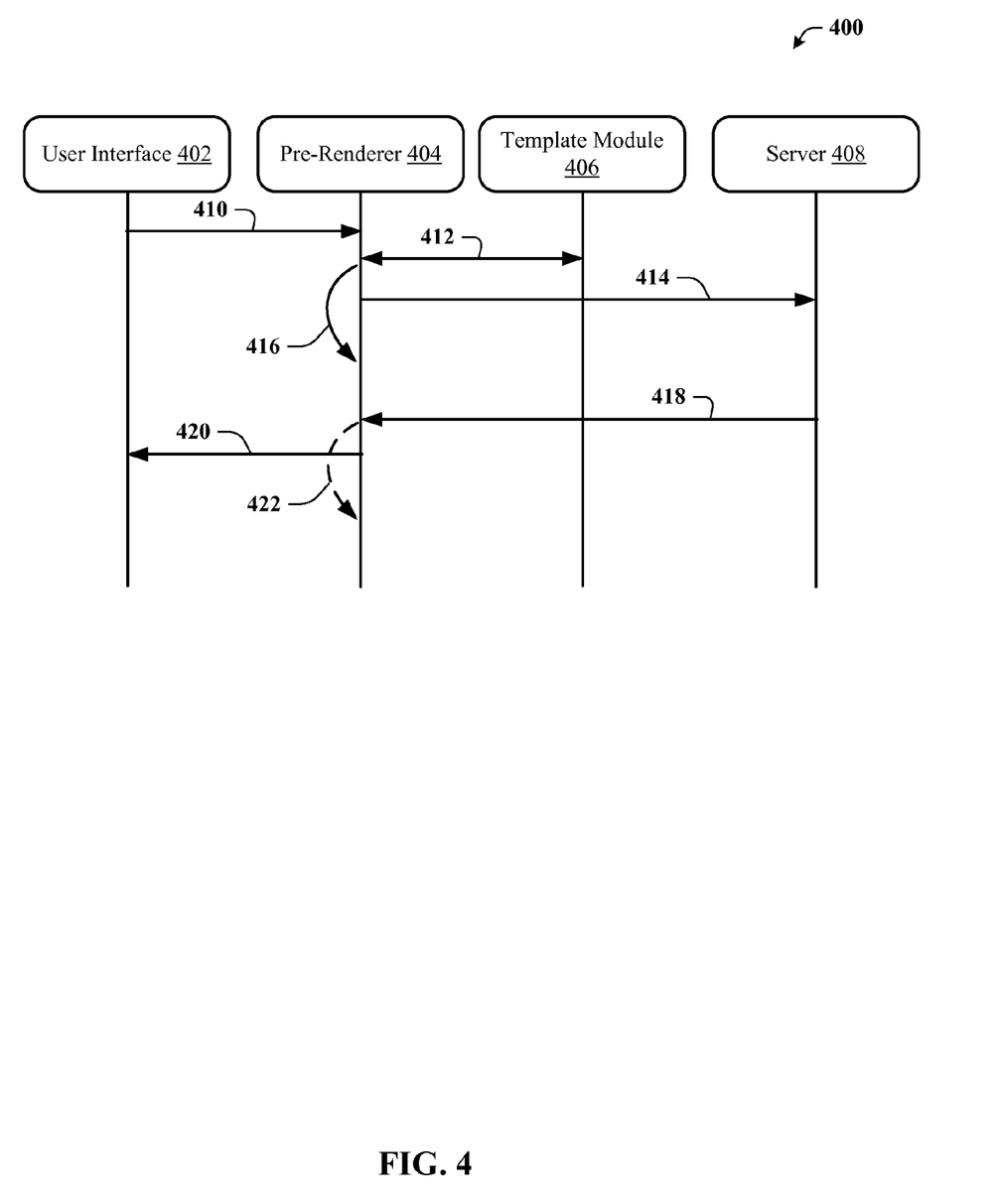
FIG. 4 illustrates a call flow diagram describing another example system for enabling hybrid web and native application according to an aspect.

FIGS. 2, 3, and 4 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 2, an example flowchart describing a system 200 which enables hybrid web and native functionality is illustrated. At reference numeral 202, a message may be received by a communications device. In one aspect, the message may include one or more links, data, objects, etc. Further, each of the one or more links, data, objects, etc. may be associated with a workflow directive. At reference numeral 204, a selection of a link is obtained. In one aspect, the link selection may be received from a user through a user interface. At reference numeral 206, a content request may be transmitted including the link selection. Contemporaneously, at reference 208, a workflow directive associated with the link selection may be processed by the communications device to pre-render a template. In one aspect, the template includes content formatting options, display/layout options, etc. In one aspect, the workflow directive may provide priority to defined sets, types, etc., of data, objects, links, etc. At reference numeral 210, a content message is received in response to the content request. In one aspect, the content may include content associated with the content request and additional content provided by a content server. At reference numeral 212, at least a portion of the received content is applied to the pre-rendered template. In one aspect, if the received content does not match the template within a threshold value, the communication device may either determine a sub-portion of the received content to display, or request a new template. In an aspect, in which a sub-portion of the content is displayed, the device may determine the displayed portion through a priority list, may rotate through the content to display, etc.

With reference now to FIG. 3, a call flow diagram flowchart describing a system 300 for enabling hybrid web and native functionality is illustrated, according to one aspect. System 300 includes a communications device 302, such as communications device 110, and server 304, such as content server 130. At 306, communications device 302 may transmit a content request to server 304. In one aspect, the content request may be formatted as an HTTP request. At 308, the server 304 may transmit content in response to the request to the communications device. In one aspect, the content may include one or more links (URLs), objects (e.g., promotions), data, etc. In one aspect, the returned content may include content provided by the server 304 that is different from and in addition to the requested content. At 310, a link selection may be made on the communications device 302. In one aspect, the selection may be made by a user and received through a user interface. At 312, the selected link may be transmitted to the server 304. In one aspect, the link may include a request for one or more additional links, data, one or more additional objects, etc. At 314, communications device may process the workflow directive associated with the selected link to pre-render a template. In one aspect, the template may be selected to allow formatting, display layout, application activity, etc., to be initiated prior to receiving a response to the link selection. In one aspect, 314 may be performed contemporaneously with 312. At 316, content is transmitted by the server 304 in response to the link selection. At 318, at least a portion of the received content is applied to the template and displayed accordingly. In one aspect, if the received content does not match the template within a threshold value, the communications device 302 may either determine to display a sub-portion of the received content, or request a new template from server 304. In an aspect, in which a sub-portion of the content is displayed, the device may determine the displayed portion through a priority list, may rotate through the content to display, etc.

Referring to FIG. 4, a call flow diagram flowchart describing another system 400 for enabling hybrid web and native functionality is illustrated, according to one aspect. System 400 includes components associated with a communications device, such as user interface 402, pre-renderer 404 and template module 406, and server 408, such as content server 130.

At 410, a user selection may select a link through user interface 402, and the selected link, along with an associated workflow directive may be communicated to a pre-renderer 404. In one aspect, the workflow directive may provide formatting, layout, etc., parameters. At 412, the pre-renderer 404 may process the received workflow directive and communicate with template module 406 to obtain one or more applicable templates. Further, at 414, the pre-renderer 404 may transmit the link to a server 408 to obtain the requested content associated with the selected link. At 416, pre-renderer 404 may process the obtained one or more templates to prepare for the requested content. At act 418, the requested content may be received by pre-renderer 404. In one aspect, the received content may include requested items such as links, data, objects, etc., and workflow directives associated with each of the items. At 420, the received content is applied to the templates and displayed with the user interface 402. Optionally, where the received content includes additional workflow directives, pre-renderer 404 may process the received workflow directives in anticipation of one or more subsequent user selections.

Figure 5:
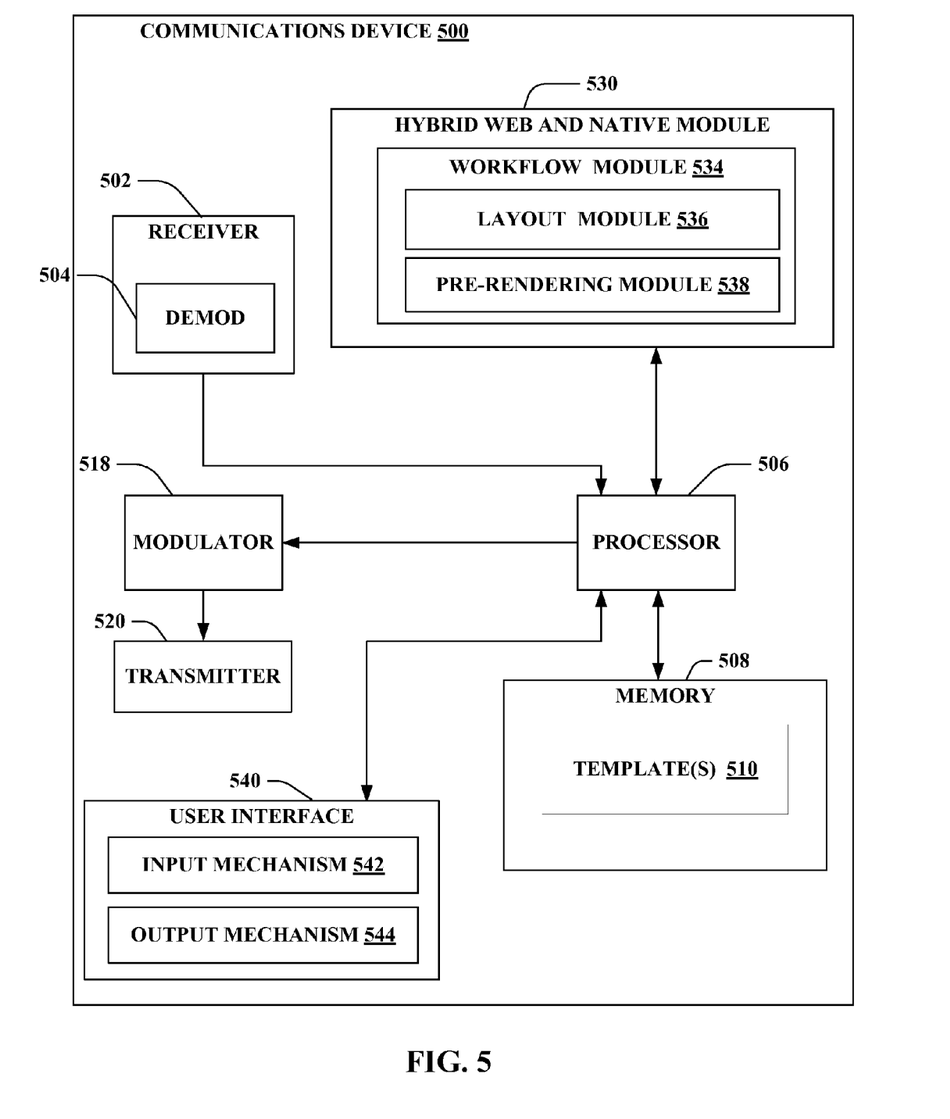
FIG. 5 illustrates a block diagram example architecture of a communications device, according to one aspect.

While still referencing FIG. 1, but turning also now to FIG. 5, an example architecture of communications device 110 is illustrated. As depicted in FIG. 5, device 500 comprises receiver 502 that receives a signal from, for instance, a receive antenna (not shown), performs typical actions on (e.g., filters, amplifies, downconverts, etc.) the received signal, and digitizes the conditioned signal to obtain samples. Receiver 502 can comprise a demodulator 504 that can demodulate received symbols and provide them to processor 506 for channel estimation. Processor 506 can be a processor dedicated to analyzing information received by receiver 502 and/or generating information for transmission by transmitter 520, a processor that controls one or more components of device 500, and/or a processor that both analyzes information received by receiver 502, generates information for transmission by transmitter 520, and controls one or more components of device 500.

Device 500 can additionally comprise memory 508 that is operatively coupled to processor 506 and that can store data to be transmitted, received data, information related to available channels, data associated with analyzed signal and/or interference strength, information related to an assigned channel, power, rate, or the like, and any other suitable information for estimating a channel and communicating via the channel. In one aspect, memory 508 can include one or more templates 510. In one aspect, templates 510 may be used to pre-render content, such as formatting, layout, etc., associated with a selected link, as defined through a workflow directive.

Further, processor 506 can provide means for obtaining a selection of one link from a first set of one or more links, wherein each link of the first set of one or more links is associated with a workflow directive. The processor 506 can further provide means for transmitting a content request including the obtained selection of the one link from the one or more links. Further, the processor 506 can provide means for processing the workflow directive associated with the one link from the first set of one or more links to pre-render a template contemporaneously with the content request transmission. Additionally, the processor 506 can provide means for receiving a content message including content in response to the content request, and means for applying at least a portion of the received content from the content message to the pre-rendered template.

It will be appreciated that data store (e.g., memory 508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 508 of the subject systems and methods may comprise, without being limited to, these and any other suitable types of memory.

Device 500 can further include hybrid web and native module 530 which may be operable to provide integrated stateful functionality to allow for local operation on and/or control of data. In one aspect, hybrid web and native module 530 may include workflow module 534 that may be operable to allow local operations on obtained data. In one aspect, workflow module 534 may include pre-rendering module 538 which may be operable to process an obtained workflow directive and pre-render a template available through layout module 536. Additionally, pre-rendering module 538 may be configured to perform operations such as, but not limited to, content downloads (e.g. network interactions) and installations, local content licensing checks, network checks for content updates and possible subsequent downloads and installs, or content purchases (e.g. calling in to a network-based purchase system, making a payment, obtaining a license, etc.).

In one aspect, workflow module 534 may include dynamic layout coding within layout module 536. Such dynamic layout coding may have presentation coding that is operable on data obtained from content server, and may control the presentation of said data. In one aspect, layout module 536 may include an updateable scripting code, such as LUA code, that may be updated (via a network update) to thereby allow efficient changes to the user experience associated with a native application.

Further, in one aspect, layout module 536 may further include a priority identifier corresponding to each piece of data of received content. For example, the content may include one or more objects, such as banners, etc., such as may be associated with a promotional set of content. Each object may have a corresponding priority identifier. As such, for example, layout module 536 may generate a view of a "landing page" user interface, and may lay out the objects on the page according to the respective priority identifier. For instance, the one or more objects may be presented in an ordered list, and the priority identifiers may comprise a plurality of different values that define a relative placement of the respective objects in the ordered list. In another aspect, layout module 536 may include a device-specific UI template that may define layout of data. In this manner, data from received content may be presented in different manners on different devices 500. Furthermore, in one aspect, each piece of data corresponding to received content may have an original data layout characteristic (e.g., defined in a workflow directive), such as an aspect ratio. In such an aspect, workflow module 534 may be operable to use the workflow directive information to generate additional versions of the data with different layout characteristics, such as different versions with different aspect ratios. For example, in an aspect, workflow module 534 can include a device database having a plurality of identified devices each with a device profile. In such aspect, each device profile may include a display parameter that defines one or more device-specific layout parameters. Accordingly, workflow module 534 may generate one or more additional versions of the data having different layout characteristics to match each of the device-specific layout parameters in the device database.

Additionally, communications device 500 may include user interface 540. User interface 540 may include input mechanisms 542 for generating inputs into communications device 500, and output mechanism 544 for generating information for consumption by the user of the communications device 500. For example, input mechanism 542 may include a mechanism such as a key or keyboard, a mouse, a touchscreen display, a microphone, etc. Further, for example, output mechanism 544 may include a display, an audio speaker, a haptic feedback mechanism, a Personal Area Network (PAN) transceiver etc. In the illustrated aspects, the output mechanism 544 may include a display operable to present media content that is in image or video format or an audio speaker to present media content that is in an audio format. Further, user interface 540 may allow a user to select one or more links. In one aspect, each link has an associated workflow directive which may provide hybrid web and native module 530 additional processing information related to the link selection.

It will be appreciated that user identity module 550 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Figure 6:
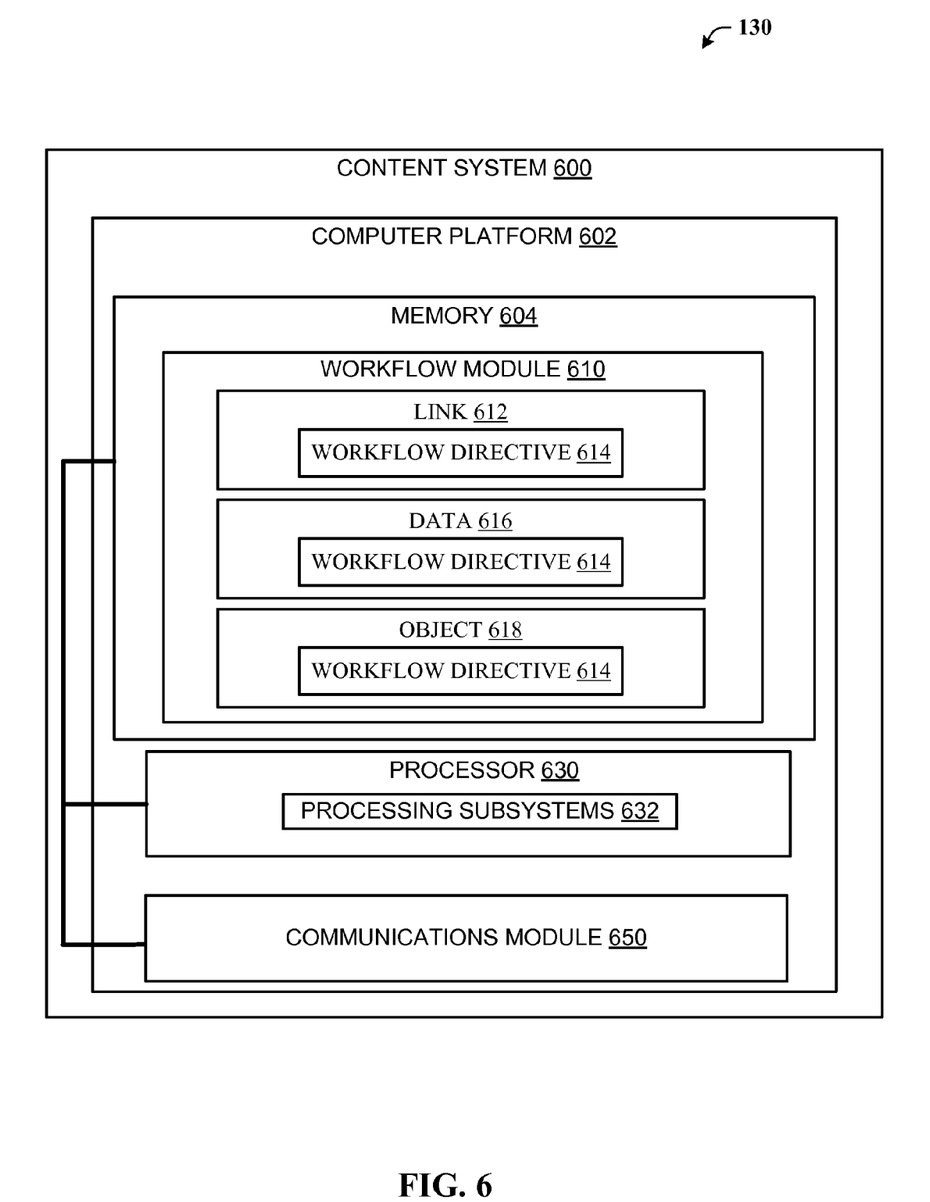
FIG. 6 illustrates example block diagram of a content system according to an aspect.

With reference to FIG. 6, illustrated is a detailed block diagram of content system 600, such as content server 130 depicted in FIG. 1. Content system 600 may comprise at least one of any type of hardware, server, personal computer, mini computer, mainframe computer, or any computing device either special purpose or general computing device. Further, the modules and applications described herein as being operated on or executed by content system 600 may be executed entirely on a single network device, as shown in FIG. 6, or alternatively, in other aspects, separate servers, databases or computer devices may work in concert to provide data in usable formats to parties, and/or to provide a separate layer of control in the data flow between devices, such as communications device 110, and the modules and applications executed by content system 600.

Content system 600 includes computer platform 602 that can transmit and receive data across wired and wireless networks, and that can execute routines and applications. Computer platform 602 includes memory 604, which may comprise volatile and nonvolatile memory such as read-only and/or random-access memory (ROM and RAM), EPROM, EEPROM, flash cards, or any memory common to computer platforms. Further, memory 604 may include one or more flash memory cells, or may be any secondary or tertiary storage device, such as magnetic media, optical media, tape, or soft or hard disk. Further, computer platform 602 also includes processor 630, which may be an application-specific integrated circuit ("ASIC"), or other chipset, logic circuit, or other data processing device. Processor 630 may include various processing subsystems 632 embodied in hardware, firmware, software, and combinations thereof, that enable the functionality of media content distribution system 14 and the operability of the network device on a wired or wireless network.

Computer platform 602 further includes communications module 650 embodied in hardware, firmware, software, and combinations thereof, that enables communications among the various components of content system 600, as well as between content system 600, and communications device 110. Communications module 650 may include the requisite hardware, firmware, software, and/or combinations thereof for establishing a wireless communication connection. According to described aspects, communications module 650 may include the necessary hardware, firmware, and/or software to facilitate wireless and/or wireline communication between content server 130 and communications device 110.

Memory 604 of content system 600 includes a workflow module 610 which may be operable to process requests by providing one or more links 612, data sets 616, and/or one or more objects 618. As noted earlier, each link 612, data set 616, and object 618 may be associated with a workflow directive 614. The workflow directive may be operable to provide a communications device 110 with additional information related to the associated item (link 612, data 616, object 618, etc.). For example, a workflow directive 614 associated with a link 612 may indicate a structure associated with content accessible through the link (e.g., list, parent directory, subdirectory, etc.). In another example, a work directive 136 associated with data 138 may indicate data set size, formatting, headers, etc. In still another example, as noted above, a workflow directive 136 associated with an object may indicate object priority, listing structure, presentation formatting, etc.

Figure 7:
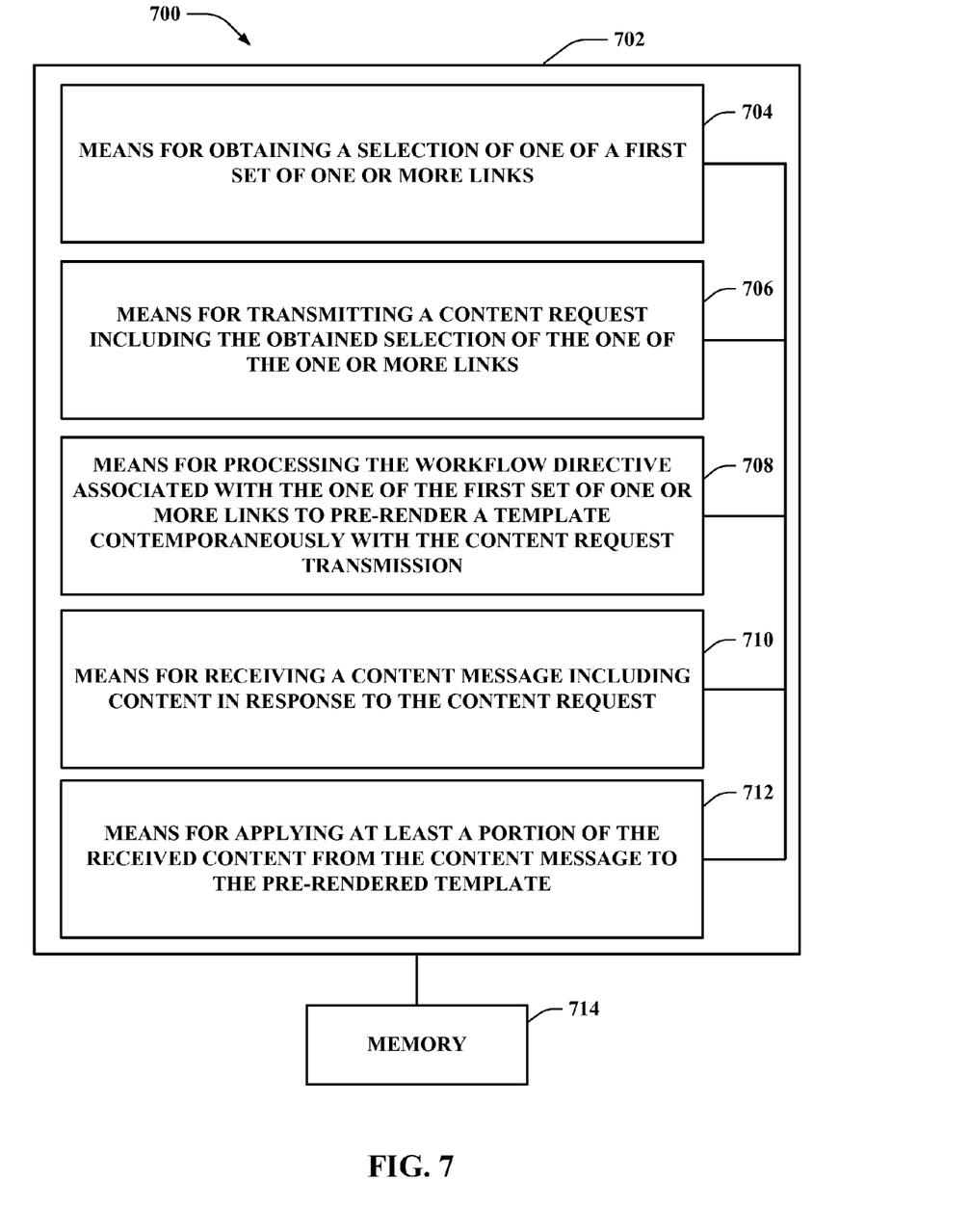
FIG. 7 illustrates an example system for enabling a hybrid web and native application in a wireless communication system.

Referring to FIG. 7, an apparatus 700 that enables a hybrid web and native application to reside at least partially within a mobile device is described, according to one aspect. It is to be appreciated that apparatus 700 is represented as including functional blocks, which can represent functions implemented by a processor, software, or combination thereof (e.g., firmware). As such, apparatus 700 includes a logical grouping 702 of electrical components that can act in conjunction. For instance, logical grouping 702 can include means for obtaining a selection of one link from a first set of one or more links, wherein each link of the first set of one or more links is associated with a workflow directive (Block 704). For example, in an aspect, the means 704 can include hybrid and native module 530 and/or processor 506. In one aspect, the content may include a second set of one or more links, one or more objects, a template format update, etc. In one such aspect, where the content includes a template format update, apparatus 700 may provide means for updating the pre-rendered template based on the received template format update. In another aspect, the content may include data that includes a first set of data associated with the content request, and a second set of data provided by a content server. In such an aspect, the second set of data may include objects, promotions, one or more links, etc. In one aspect, the workflow directive may include priority indications associated with displaying the received content using the template. In such an aspect, the priority indications may include an ordered list for displaying at least one of: the data, or the one or more objects.

Further, logical grouping 702 can include means for transmitting a content request including the obtained selection of the one link from the one or more links (Block 706). For example, in an aspect, the means 706 can include transmitter 520 and/or processor 506. Further, logical grouping 702 can include means for processing the workflow directive associated with the one link from the first set of one or more links to pre-render a template contemporaneously with the content request transmission (Block 708). For example, in an aspect, the means 708 can include hybrid and native module 530 and/or processor 506. Further, logical grouping 702 can include means for receiving a content message including content in response to the content request (Block 710). For example, in an aspect, the means 706 can include receiver 502 and/or processor 506. Further, logical grouping 702 can include means for applying at least a portion of the received content from the content message to the pre-rendered template (Block 712). For example, in an aspect, the means 708 can include hybrid and native module 530 and/or processor 506.

Additionally, apparatus 700 can include a memory 714 that retains instructions for executing functions associated with electrical components 704, 706, 708, 710, and 712. While shown as being external to memory 714, it is to be understood that one or more of electrical components 704, 706, 708, 710 and 712 can exist within memory 714. In an aspect, for example, memory 714 may be the same as or similar to memory 508 (FIG. 5).

In one aspect, apparatus 700 can provide means for receiving a first message including the first set of one or more links and data, one or more objects, etc. In such an aspect, each of the data, and one or more objects may be associated with a workflow directive. In another aspect, apparatus 700 can provide means for determining content formatting, display layout, etc., for the template from the workflow directive. In another aspect, apparatus 700 can provide means for mapping a portion of the received content to the template. In another aspect, apparatus 700 can provide means for determining that the at least a portion of the content does not match the pre-rendered template, means for determining a sub-portion of the content to apply to the template, and means for applying the sub-portion to the template. In another aspect, apparatus 700 can provide means for determining the at least a portion of the content does not match the pre-rendered template, means for transmitting a template format update request to match the received content, means for receiving a second template format update in response to the template format update request, and means for applying the at least a portion of the received content to a second template generated using the second template format update.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs usually reproduce data optically with lasers. Combinations of the above should also be included within the scope of computer-readable media.

While the foregoing disclosure discusses illustrative aspects and/or implementations, it should be noted that various changes and modifications could be made herein without departing from the scope of the described aspects and/or implementations as defined by the appended claims. Furthermore, although elements of the described aspects and/or implementations may be described or claimed in the singular, the plural is contemplated unless limitation to the singular is explicitly stated. Additionally, all or a portion of any aspect and/or implementation may be utilized with all or a portion of any other aspect and/or implementation, unless stated otherwise.

What is claimed is:

1. A method for providing hybrid web and native functionality, comprising:
   obtaining, on a device, a selection of one link from a first set of one or more links, wherein each link of the first set of one or more links is associated with a workflow directive;
   transmitting, by the device, a content request including the obtained selection of the one link from the first set of one or more links;
   processing, on the device, the workflow directive associated with the one link from the first set of one or more links to pre-render a template contemporaneously with the transmission of the content request;
   receiving, at the device, a content message including content in response to the content request; and
   applying, on the device, at least a portion of the received content from the content message to the pre-rendered template.

2. The method of claim 1, wherein the received content comprises at least one of: a second set of one or more links, data, or one or more objects.

3. The method of claim 1, wherein the received content comprises a template format update, and wherein the applying further comprises updating the pre-rendered template based on the received template format update.

4. The method of claim 1, further comprising:
   receiving a first message including the first set of one or more links and at least one of data associated with the workflow directive or one or more objects associated with the workflow directive.

5. The method of claim 1, wherein the processing further comprises:
   determining at least one of content formatting, or display layout for the template from the workflow directive.

6. The method of claim 1, wherein the workflow directive comprises priority indications associated with displaying the received content using the template.

7. The method of claim 6, wherein the priority indications comprise an ordered list for displaying at least one of data associated with the workflow directive or one or more objects associated with the workflow directive.

8. The method of claim 1, wherein the applying further comprises:
   mapping the applied portion of the received content to the template.

9. The method of claim 1, wherein the applying further comprises:
   determining that at least a portion of the received content does not match the pre-rendered template;
   determining a sub-portion of the received content to apply to the template; and
   applying the sub-portion to the template.

10. The method of claim 1, wherein the applying further comprises:
    determining that at least a portion of the received content does not match the pre-rendered template;
    transmitting a template format update request to match the received content;
    receiving a second template format update in response to the template format update request; and
    applying the portion of the received content that does not match the pre-rendered template to a second template generated using the second template format update.

11. The method of claim 1, wherein the received content further comprises data, wherein the data comprises a first set of data associated with the content request, and a second set of data provided by a content server.

12. The method of claim 11, wherein the second set of data comprises at least one of objects, promotions, or one or more links.

13. At least one processor configured to provide hybrid web and native functionality, the at least one processor configured to:
    obtain a selection of one link from a first set of one or more links, wherein each link of the first set of one or more links is associated with a workflow directive;
    transmit a content request including the obtained selection of the one link from the first set of one or more links;
    process the workflow directive associated with the one link from the first set of one or more links to pre-render a template contemporaneously with the transmission of the content request;
    receive a content message including content in response to the content request; and
    apply at least a portion of the received content from the content message to the pre-rendered template.

14. A computer program product, comprising:
    a computer-readable medium comprising at least one instruction for providing hybrid web and native functionality, wherein the at least one instruction, when executed on a computer, causes the computer to:
    obtain a selection of one link from a first set of one or more links, wherein each link of the first set of one or more links is associated with a workflow directive;
    transmit a content request including the obtained selection of the one link from the first set of one or more links;
    process the workflow directive associated with the one link from the first set of one or more links to pre-render a template contemporaneously with the transmission of the content request;
    receive a content message including content in response to the content request; and
    apply at least a portion of the received content from the content message to the pre-rendered template.

15. An apparatus, comprising:
    means for obtaining a selection of one link from a first set of one or more links, wherein each link of the first set of one or more links is associated with a workflow directive;
    means for transmitting a content request including the obtained selection of the one link from the first set of one or more links;
    means for processing the workflow directive associated with the one link from the first set of one or more links to pre-render a template contemporaneously with the transmission of the content request;
    means for receiving a content message including content in response to the content request; and
    means for applying at least a portion of the received content from the content message to the pre-rendered template.

16. An apparatus for providing hybrid web and native functionality, comprising:
- a hybrid web and native module operable to obtain a selection of one link from a first set of one or more links, wherein each link of the first set of one or more links is associated with a workflow directive;
- a transmitter operable to transmit a content request including the obtained selection of the one link from the first set of one or more links, the hybrid web and native module being further operable to process the workflow directive associated with the one link from the first set of one or more links to pre-render a template contemporaneously with the transmission of the content request; and
- a receiver operable to receive a content message including content in response to the content request,
- wherein the hybrid web and native module is further operable to apply at least a portion of the received content from the content message to the pre-rendered template.

17. The apparatus of claim 16, wherein the received content comprises at least one of a second set of one or more links, data, or one or more objects.

18. The apparatus of claim 16, wherein the received content comprises a template format update, and wherein the hybrid web and native module is further operable to update the pre-rendered template based on the received template format update.

19. The apparatus of claim 16, wherein the receiver is further operable to receive a first message including the first set of one or more links and at least one of data associated with the workflow directive or one or more objects associated with the workflow directive.

20. The apparatus of claim 16, wherein the hybrid web and native module is further operable to determine at least one of content formatting, or display layout for the template from the workflow directive.

21. The apparatus of claim 16, wherein the workflow directive comprises priority indications associated with displaying the received content using the template.

22. The apparatus of claim 21, wherein the priority indications comprise an ordered list for displaying at least one of data associated with the workflow directive or one or more objects associated with the workflow directive.

23. The apparatus of claim 16, wherein the hybrid web and native module is further operable to map the applied portion of the received content to the template.

24. The apparatus of claim 16, wherein the hybrid web and native module is further operable to:
- determine that at least a portion of the received content does not match the pre-rendered template;
- determine a sub-portion of the received content to apply to the template; and
- apply the sub-portion to the template.

25. The apparatus of claim 16, wherein the hybrid web and native module is further operable to determine that at least a portion of the received content does not match the pre-rendered template,
- wherein the transmitter is further operable to transmit a template format update request to match the received content,
- wherein the receiver is further operable to receive a second template format update in response to the template format update request; and
- wherein the hybrid web and native module is further operable to apply the portion of the received content that does not match the pre-rendered template to a second template generated using the second template format update.

26. The apparatus of claim 16, wherein the received content further comprises data, and wherein the data comprises a first set of data associated with the content request, and a second set of data provided by a content server.

27. The apparatus of claim 26, wherein the second set of data comprises at least one of objects, promotions, or one or more links.

* * * * *